July 23, 1940.　　J. McARTHUR　　2,209,166
FLY CASTING REEL
Filed Sept. 14, 1938
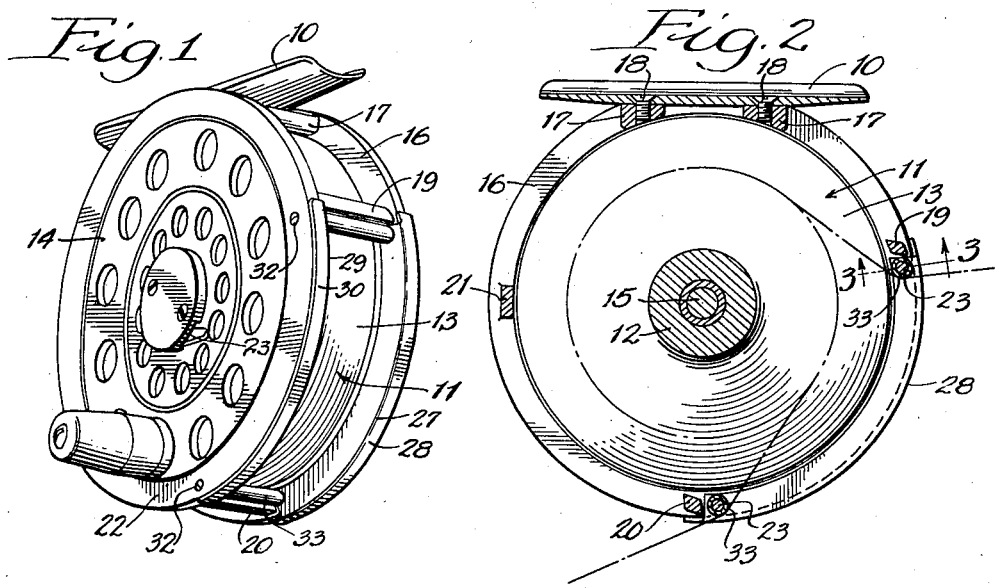
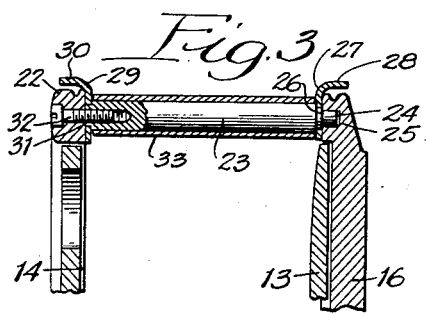
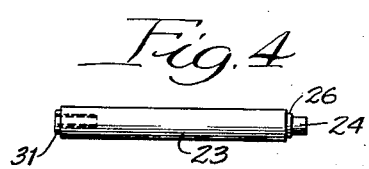
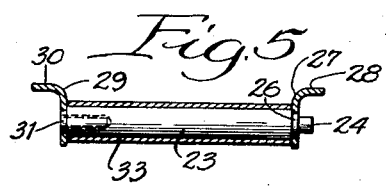
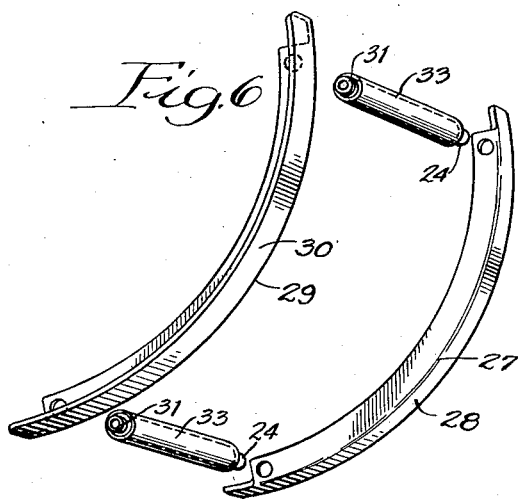
Inventor:
Joseph McArthur,
By Banning & Banning
Attorneys.

Patented July 23, 1940

2,209,166

UNITED STATES PATENT OFFICE 2,209,166

FLY CASTING REEL

Joseph McArthur, Dowagiac, Mich., assignor to James Heddon's Sons, Dowagiac, Mich., a corporation of Michigan Application September 14, 1938, Serial No. 229,884

1 Claim. (Cl. 242—84.1)

In the use of a reel on a fly casting rod, it is customary to pay out or strip the line from the reel with the left hand while whipping the rod with the right hand, and under these conditions, the line as it is drawn out is sharply bent or flexed at the point where it leaves the reel so that it is desirable to make provision against undue friction at this point without, however, unduly confining the line at the point of emergence from the reel. In numerous prior constructions with which I am familiar, it has been customary to provide a ring through which the line passes which is sometimes faced with agate or the like, but the use of such a ring so confines the line that it has a tendency to pile up in the center of the spool, causing the top coils to fall off at the side and leave loose loops which will be unwound with subsequent turnings of the reel, and when stripping the line, these loops frequently cause the reel to have a jerky motion and often cause a tangle in the line. The present invention dispenses with such a confining ring and affords greater freedom for the escape of the line and at the same time makes provision for the avoidance of friction by affording rolling surfaces for the contact of the line, so that the objections inherent in the use of a confining ring are avoided without, however, subjecting the line to appreciable friction.

Further objects of the invention appear from the description thereof in conjunction with the accompanying drawing, wherein—

Figure 1 is a perspective view of the reel of the present invention;

Fig. 2 is a sectional elevation thereof;

Fig. 3 is a sectional detail taken through line 3—3 of Fig. 2;

Figs. 4 and 5 are details of the roller guide; and

Fig. 6 is a perspective view of the guide elements in disassembled relation.

The reel of the present invention is mounted in the usual manner on the underside of the rod at the extreme butt thereof and comprises a mounting plate 10 of the usual character which is secured within the reel seat. The reel further comprises a spool 11 having an integrally formed hub portion 12 and disk-shape spaced side walls 13 and 14, which parts in conjunction constitute the spool upon which the line is wound. The hub is mounted upon a stub shaft 15 which extends inwardly from the rear face plate 16, which sockets the side wall 13 of the spool and which is provided at the top with cross bars 17 which is provided at the top with cross bars 17 which are secured by screws 18 to the base plate 10.

The base cross bars 17 are supplemented by a front cross bar 19, a center cross bar 20 and a rear cross bear 21, which cross bars in conjunction unite with a front ring 22 within the confines of which the front side wall 14 of the spool rotates. The rear face plate, the front ring and the connecting cross bars are preferably integrally formed so as to afford a rugged frame work for the support of the spool. A suitable click mechanism 23 may be provided which, however, affords no essential portion of the present invention. The above description relates to the general structure of the reel to which the special features of the present invention are applied.

The line as it is paid out or stripped from the spool and as it is later wound back upon the spool passes out between the front cross bar 19 and the center cross bar 20 which are spaced to afford an opening which extends substantially 90 degrees through the periphery of the spool. Immediately adjacent the cross bars 19 and 20 and within the space through which the line passes, are located posts 23, each of which is provided with a reduced end stud 24 which is socketed within a recess 25 in the rear face plate 16 of the reel. Immediately adjacent the end stud is a somewhat enlarged boss or shoulder portion 26 upon which is mounted a rear arcuate guide plate 27 having a flange 28 which embraces the exposed inner surface of the rear face plate and furnishes a smooth frictionless side surface for the paying out of the line. A similar guide plate 29 having a flange 30 overlaps the surface of the ring 22 and is mounted upon a reduced stud 31 at the forward end of the post 23 so that the forward guide plate is clamped between the post and the inner face of the ring 22. A screw 32 is entered through the ring and into the end of the post which holds the post in position and clamps the guide plates 27 and 29 immovably in place. The post serves as a mounting for a rotating sleeve 33 which affords a non-frictional surface for the passage of the line. The construction just described is duplicated at each end of the space through which the line passes, so that the line will bear against a rolling surface at each end and irrespective of the position which the line may occupy with respect to the spool.

The rigid frame work afforded by the rear face plate and the forward ring with the cross bar connections, prevents any sagging or displacement of the parts composing the reel frame, and the posts 23 not only serve as mountings for the line guide elements but also reenforce the reel to a material degree. The surfaces contacted by the line may be of hard and highly polished metal so that the line may be paid out or reeled in or whipped in any manner incidental to fly casting without friction in any appreciable degree and at the same time the wide space afforded for the escape of the line, occasioned by the omission of a confining ring, enables the line to be manipulated more evenly and with greater advantage than is possible where a guide ring is employed. By providing roller mountings in close proximity to the integral cross bars of the reel, the structural integrity of the frame is not dependent upon the roller mountings which constitute desirable supplemental elements in the reenforcement of the frame.

I claim:

In a fishing reel, the combination of an integrally formed frame comprising a rear face plate, a forward open ring, base connecting bars, and front, center and rear cross bars, all integrally connecting the margin of the face plate and the open ring, the front and center cross bars being spaced at least 90° apart to provide an unconfined space at the front of the reel for the passage of the line, a spool carried by the frame and having its rear wall in contiguous relation to the inner face of the rear plate and its front wall in position to fill the space within the open ring, arcuate guides respectively overlying the exposed margins of the face plate and ring throughout the space provided for the passage of the line, posts each having one end rigidly supported by the margin of the rear face plate and the other end by the open ring, and having their ends engaging with and serving to clamp the opposite ends of the arcuate guides, and rollers mounted upon said posts for affording an anti-friction contact for the line, said posts standing respectively in closely adjacent relation to the front and center connecting bars and affording supplemental reinforcement for the reel.

JOSEPH McARTHUR.